United States Patent

Fandetti et al.

[15] 3,645,562

[45] Feb. 29, 1972

[54] COUPLING DEVICE

[72] Inventors: Matthew R. Fandetti, 42 Belmont Street, Brunswick, Maine 04011; Joseph P. De Azevedo, 1065 Farm Road, Secaucus, N.J. 07094

[22] Filed: Mar. 10, 1970

[21] Appl. No.: 18,136

[52] U.S. Cl. ..................................285/73, 285/360
[51] Int. Cl. ..........................................F16l 55/00
[58] Field of Search...............285/70, 73, 360, 376, 391, 285/401, 394

[56] References Cited

UNITED STATES PATENTS

| 508,448 | 11/1893 | Terlinden | 285/70 X |
| 1,739,131 | 12/1924 | Von N. Eick | 285/79 |

Primary Examiner—Dave W. Arola
Attorney—F. J. Pisarra

[57] ABSTRACT

A coupling device consisting of a pair of identical one-piece units adapted to be placed into and out of interlocking engagement. Each unit includes a cylindrical first member, a second member extending above the first member, and a pair of third members extending above the first and second members, the upper surfaces of these members being planar and parallel. An opening extends through the first and second members. The second member is formed with a pair of spaced inwardly extending recesses and includes a plurality of spaced first locking elements each of which is positioned to a side of corresponding recess. Each first locking element has a lower surface spaced from the upper surface of the first member and inclined downwardly in a direction away from the corresponding recess. Each third member includes a second locking element projecting over and above the second member and having a lower surface that is spaced from the upper surface of the second member and is inclined downwardly from each end.

6 Claims, 5 Drawing Figures

Patented Feb. 29, 1972
3,645,562
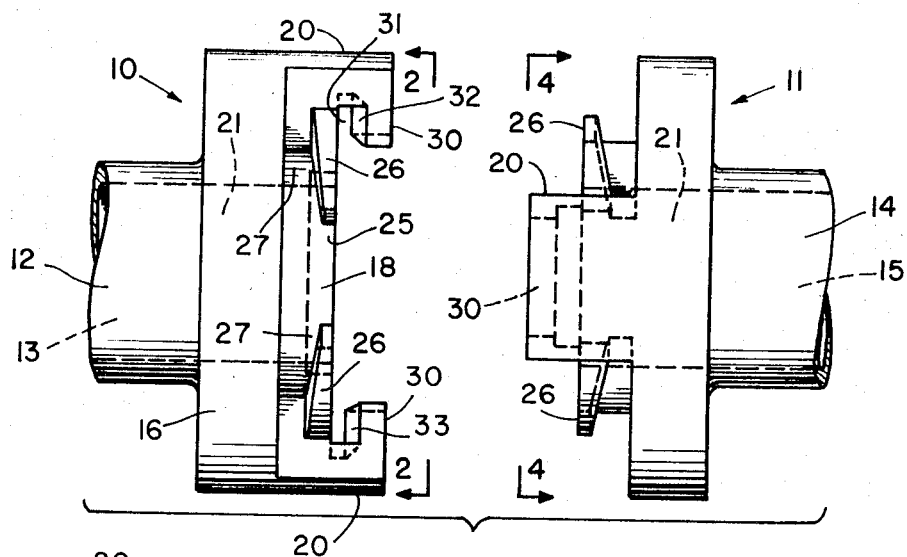
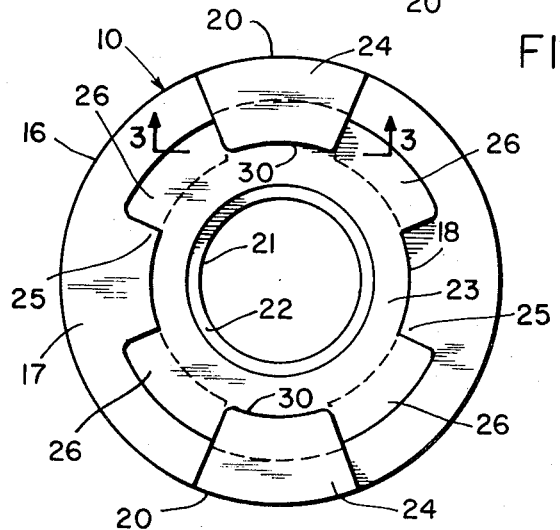
FIG. 1
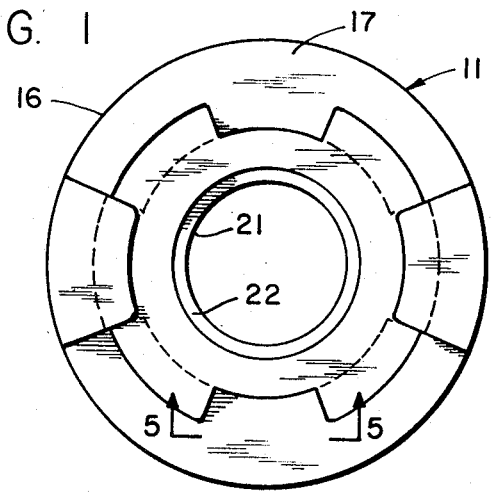
FIG. 2
FIG. 4
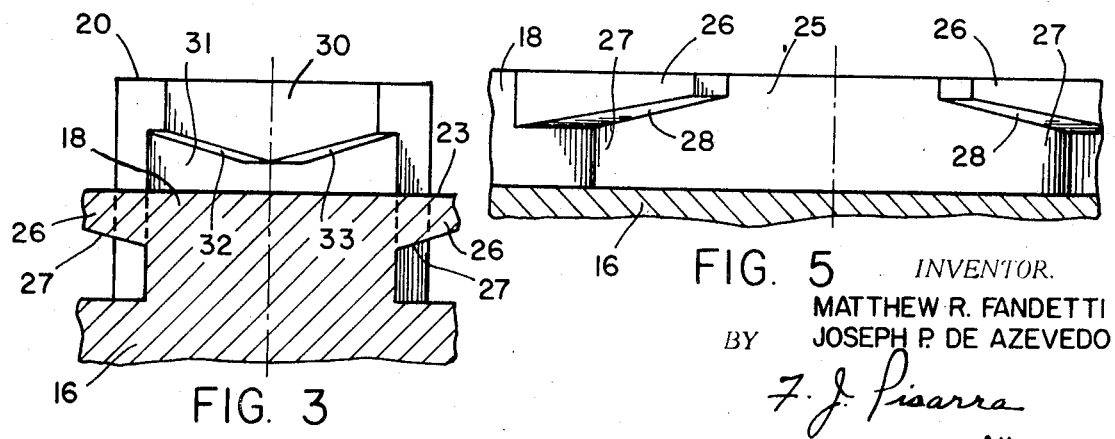
FIG. 3
FIG. 5
INVENTOR.
MATTHEW R. FANDETTI
BY JOSEPH P. DE AZEVEDO
F. J. Pisarra
Attorney

COUPLING DEVICE

BACKGROUND OF THE INVENTION

The coupling device of this invention has many applications and various uses. It is especially useful as an effective, fluidtight, detachable connector for quickly joining and subsequently separating two sections of a wide variety of conduits, such as flexible hose or tubing and semirigid or rigid piping. For this reason, the ensuing discussion and the herein described and illustrated embodiment of the invention are directed to coupling devices for conduits.

There have been a number of developments over the years in the art of pipe couplings. Such developments are exemplified by relatively old (1867) Perkins et al. U.S. Pat. No. 68,650, relatively recent (1960) Schneider U.S. Pat. No. 2,950,130, and intervening Sewell U.S. Pat. No. 103,785, Terlinden U.S. Pat. No. 508,448, Farrow U.S. Pat. No. 611,618, Bates U.S. Pat. No. 822,423, Babos U.S. Pat. No. 1,151,851 and Eick U.S. Pat. No. 1,739,131.

So far as is known to us, prior art coupling devices have had, at best, only limited commercial acceptance due to various objections. For one thing, most presently available coupling devices are complex in design and, therefore, expensive in manufacturing costs; are not adapted to be readily and easily placed into and out of locking engagement, as required; and/or are incapable of providing an effective fluidtight seal.

Coupling devices according to this invention are free of the above-noted objections. Moreover, the present invention includes a number of important features and affords worthwhile advantages which will be readily understood by persons trained in the art from the detailed description that follows and the accompanying drawing.

SUMMARY OF THE INVENTION

This invention relates to the art of coupling devices and pertains, in one of its more specific aspects, to a fluid conduit coupling device having improved features of design and construction.

A preferred and recommended coupling device according to this invention consists of a pair of identical one-piece units that are adapted to be easily and quickly placed into and out of interlocking engagement, as desired. Each unit includes a first member having a planar upper surface, a second member carried by and extending above the first member, and a pair of spaced third members carried by the first member and extending above the first and second members. The second and third members have planar upper surfaces which are parallel to the upper surface of the first member. The second member is provided with a pair of spaced inwardly extending recesses and includes a plurality of first locking elements. Each locking element is located to a side of a corresponding recess and has a lower surface that is spaced from the upper surface of the first member and is inclined downwardly in a direction away from the corresponding recess. Each third member includes a second locking element projecting over and above the second member and positioned adjacent a first locking element. Each second locking element has an upper surface that is coplanar with the upper surfaces of the third members and a lower surface that is spaced from the upper surface of the second member and is inclined downwardly from at least one end.

The referred-to units of our coupling device may be made of any suitable material, depending on the properties, characteristics, temperature, pressure, etc., of fluids that are to be transmitted therethrough. Among such materials are stainless steel, brass, appropriate synthetic plastic compositions and the like which may be conveniently cast, molded and/or machined in forming the units.

One of the features of the preferred embodiment of the invention is that each unit is so constructed and configured as to permit a pair thereof to be readily placed into locking engagement by turning one unit in either direction relative to the other unit to effect quick engagement and subsequently turning such unit in a corresponding reverse direction to effect quick disengagement.

It is the primary object of this invention to provide a coupling device having improved features of design and construction.

Another object of this invention is to provide an improved coupling device comprising a pair of identical units which are adapted to be readily placed into and out of interlocking engagement and form, when in interlocking engagement, an effective fluidtight seal.

A further object of the invention is the provision of a coupling device of the character indicated that is relatively simple in design; that is sturdy and durable in construction; that is reasonable in manufacturing cost; that is adapted to be easily and quickly placed into and out of active service; that provides an effective seal in use; and that is capable of performing its intended functions in an entirely satisfactory manner over extended periods of time.

The enumerated objects and additional objects, together with the advantages of the invention, will be apparent to persons trained in the art from the following detailed description and the annexed drawing which respectively describe and illustrate a preferred and recommended embodiment of a coupling device constructed in accordance with this invention.

BRIEF DESCRIPTION OF THE DRAWING

In the drawing wherein like reference numerals denote corresponding parts in the several views:

FIG. 1 is an exploded view of the coupling device, showing the relative positions of its units shortly before effecting locking engagement therebetween or after effecting disengagement;

FIG. 2 is a view of one of the units taken along line 2—2 of FIG. 1;

FIG. 3 is an enlarged fragmentary view taken along line 3—3 of FIG. 2;

FIG. 4 is a view taken along line 4—4 of FIG. 1; and

FIG. 5 is a view in enlargement taken along line 5—5 of FIG. 4.

DESCRIPTION OF THE PREFERRED EMBODIMENT

Referring initially to FIGS. 1, 2 and 4 of the drawing, the illustrated coupling device of this invention comprises a pair of identical one-piece units 10 and 11. Unit 10 is connected to a conduit 12 having a longitudinal passage 13 while unit 11 is connected to a like conduit 14 having a corresponding passage 15.

Each of units 10 and 11 includes a cylindrical body or first member 16 having a planar upper surface 17 (FIGS. 2 and 4), a second member 18 extending above the first member, as viewed in FIGS. 2 and 4, and a pair of third members 20 extending above the first and second members. The first and second members are provided with a central through opening 21 which communicates with a corresponding conduit passage. Each second member 18 is also provided with an annular recess that merges with its through opening 21. Second member 18 has a planar upper surface 23 while third members 20 have coplanar upper surfaces 24 (FIG. 2). The respective upper surfaces 17, 23 and 24 of members 16, 18 and 20 are parallel.

Second member 18 is provided with a pair of spaced recesses 25 that are positioned along opposite portions of an extended diameter of opening 21. Each recess 25 is defined in part by a pair of first locking elements 26 that constitute portions of member 18. Each locking element 26 is spaced above upper surface 17 of member 16, as indicated at 27 (FIGS. 1 and 5), and has a lower surface 28 that is inclined downwardly in a direction away from a corresponding recess 25 (FIG. 5).

Referring now to FIGS. 1 and 3, each third member 20 includes a second locking element 30 which extends over and above second member 18 and is spaced from its upper surface 23, as indicated by numeral 31. The upper surfaces of locking elements 30 are coincident with the upper surfaces 24 of the remainder of members 20. Each locking element 30 is formed with a pair of oppositely inclined lower surfaces 32 and 33 (FIG. 3). As is best shown in FIG. 3, surface 32 is inclined downwardly toward the right from the left end of locking element 30 while surface 33 is inclined downwardly toward the left from the right end of locking element 30.

For the purpose of outlining the operation of the herein described embodiment of the invention, it is assumed that coupling units 10 and 11 are initially in the relative position shown in FIG. 1. With the parts in this position, the units are aligned axially and unit 11 has been turned about its axis so that its parts are 90° from the position of the corresponding parts of unit 10. Unit 11 is now moved toward the left, as viewed in FIG. 1, so that its third members 20 register with corresponding recesses 25 of unit 10 and its "upper" surfaces 17, 23 and 24 are directly adjacent to or bear against the corresponding surfaces of unit 10. Either unit is then turned in either direction about its axis. This causes the first locking elements 26 of each unit to enter corresponding recesses 31 of the other unit and the second locking elements 30 of each unit to enter the corresponding recesses 27 of the other unit. This also causes interlocking engagement of the units as will be evident from an examination of the drawing. The units may be readily disengaged by predetermined rotational movement of one of the units relative to the other in a reverse direction.

The instant coupling device has its parts so constructed and arranged as to effect locking engagement therebetween by turning one of the units in either direction relative to the other. This is due to the relative position of the first and second locking elements and the inclinations of their corresponding "lower" surfaces, as described and illustrated.

If desired, a sealing gasket (not shown) may be interposed between unit 10 and 11 at the time of assembly. Such a gasket may be made of any suitable material and may register with recesses 22.

From the foregoing, it is believed that the objects, advantages, construction and operation of our present invention will be readily comprehended by persons skilled in the art without further description. Although the invention has been herein shown and described in a simple and practicable form, it is recognized that certain parts thereof are representative of other parts which may be used in substantially the same manner to accomplish substantially the same results. Therefore, it is to be understood that the invention is not to be limited to the exact details described herein, but is to be accorded the full scope and protection of the appended claims.

1. A coupling device comprising a pair of units adapted to be placed into and out of interlocking engagement, each unit including a first member having a planar upper surface, a second member carried by an extending above the first member and having a planar upper surface that is parallel to the upper surface of the first member, and a pair of spaced third members carried by the first member and extending above the first and second members, each third member having a planar upper surface that is parallel to the upper surfaces of the first and second members, the second member having a pair of spaced inwardly extending recesses and including a plurality of first locking elements, each of which is positioned to a side of a corresponding recess and has an upper surface that is coplanar with the upper surface of the second member and a lower surface that is spaced from the upper surface of the first member and is inclined downwardly in a direction away from the corresponding recess, each third member being positioned between a separate pair of first locking elements, each third member including a second locking element projecting over and above the second member and positioned adjacent a first locking element, each second locking element having an upper surface that is coplanar with the upper surfaces of the third members and a lower surface that is spaced from the upper surface of the second member, one portion of the lower surface of each second locking element being inclined downwardly from one end and another portion is inclined downwardly from the opposite end.

2. A coupling device according to claim 1 wherein at least one of the units is provided with an opening that extends through the first and second members and the third members are disposed to opposite sides of the opening.

3. A coupling device according to claim 2 wherein the second member of at least one of the units is provided with an annular recess for reception of at least part of a sealing gasket, said annular recess extending downwardly from the upper surface of such second member and being intermediate the third members.

4. A coupling device according to claim 2 wherein, in each unit, the recesses in the second member, the first locking elements and the second locking elements are respectively spaced along corresponding extended diameters of said opening.

5. A coupling device according to claim 4 wherein each second locking element is located above and intermediate a pair of second locking elements.

6. A coupling device according to claim 5 wherein the second member of each unit is provided with an annular recess for reception of fluid sealing means, each annular recess merging with a corresponding referred-to opening.

* * * * *